(12) United States Patent
Skoric et al.

(10) Patent No.: US 8,887,309 B2
(45) Date of Patent: Nov. 11, 2014

(54) METHOD AND APPARATUS FOR INFORMATION CARRIER AUTHENTICATION

(75) Inventors: Boris Skoric, Eindhoven (NL); Pim Theo Tuyls, Eindhoven (NL); Antonius Hermanus Maria Akkermans, Eindhoven (NL); Willem Gerard Ophey, Eindhoven (NL)

(73) Assignee: Intrinsic ID B.V., Eindhoven (NL)

( * ) Notice: Subject to any disclaimer, the term of this patent is extended or adjusted under 35 U.S.C. 154(b) by 1026 days.

(21) Appl. No.: 12/064,089

(22) PCT Filed: Aug. 16, 2006

(86) PCT No.: PCT/IB2006/052820
§ 371 (c)(1),
(2), (4) Date: Feb. 19, 2008

(87) PCT Pub. No.: WO2007/023420
PCT Pub. Date: Mar. 1, 2007

(65) Prior Publication Data
US 2008/0229119 A1    Sep. 18, 2008

(30) Foreign Application Priority Data

Aug. 23, 2005  (EP) .................................. 05107719

(51) Int. Cl.
*G06F 7/04* (2006.01)
*G06F 21/00* (2013.01)
*G11B 20/00* (2006.01)
*H04L 9/32* (2006.01)

(52) U.S. Cl.
CPC ....... *G11B 20/00086* (2013.01); *H04L 2209/60* (2013.01); *G11B 20/00173* (2013.01);
(Continued)

(58) Field of Classification Search
CPC ..... H04L 9/3294; H04L 9/3281; H04L 63/12; H04L 63/123; H04L 63/0428; H04L 2463/101; G06F 21/645; G06F 21/10; G11B 20/00086; G11B 20/0013; G11B 20/00173

USPC ......... 713/168, 172, 176, 177, 178, 179, 180, 713/186, 193; 726/9, 20, 27, 30, 2, 3, 4; 380/259, 264, 44, 45, 46, 47, 277
See application file for complete search history.

(56) References Cited

U.S. PATENT DOCUMENTS 5,920,628 A * 7/1999 Indeck et al. ................. 713/180
6,317,829 B1 * 11/2001 Van Oorschot ............... 713/155
(Continued)

FOREIGN PATENT DOCUMENTS

EP    0997899 A2    5/2000
EP    1152402 A1    11/2001
(Continued)

OTHER PUBLICATIONS

Guillou et al. (PCT Publication No. WO 00/45550).*
(Continued)

*Primary Examiner* — Abu Sholeman
(74) *Attorney, Agent, or Firm* — Thorne & Halajian, LLP; Gregory L. Thorne

(57) ABSTRACT

The present invention relates to a method of enabling authentication of an information carrier (105), the information carrier (105) comprising a writeable part (155) and a physical token (125) arranged to supply a response upon receiving a challenge, the method comprising the following steps; applying a first challenge (165) to the physical token (125) resulting in a first response (170), and detecting the first response (170) of the physical token (125) resulting in a detected first response data (175), the method being characterized in that it further comprises the following steps; forming a first authentication data (180) based on information derived from the detected first response data (175), signing the first authentication data (180), and writing the signed authentication data (185) in the writeable part (155) of the information carrier (105). The invention further relates to a method of authentication of an information carrier (105), as well as to devices for both enabling authentication as well as authentication of an information carrier (105).

21 Claims, 5 Drawing Sheets

Figure 1:
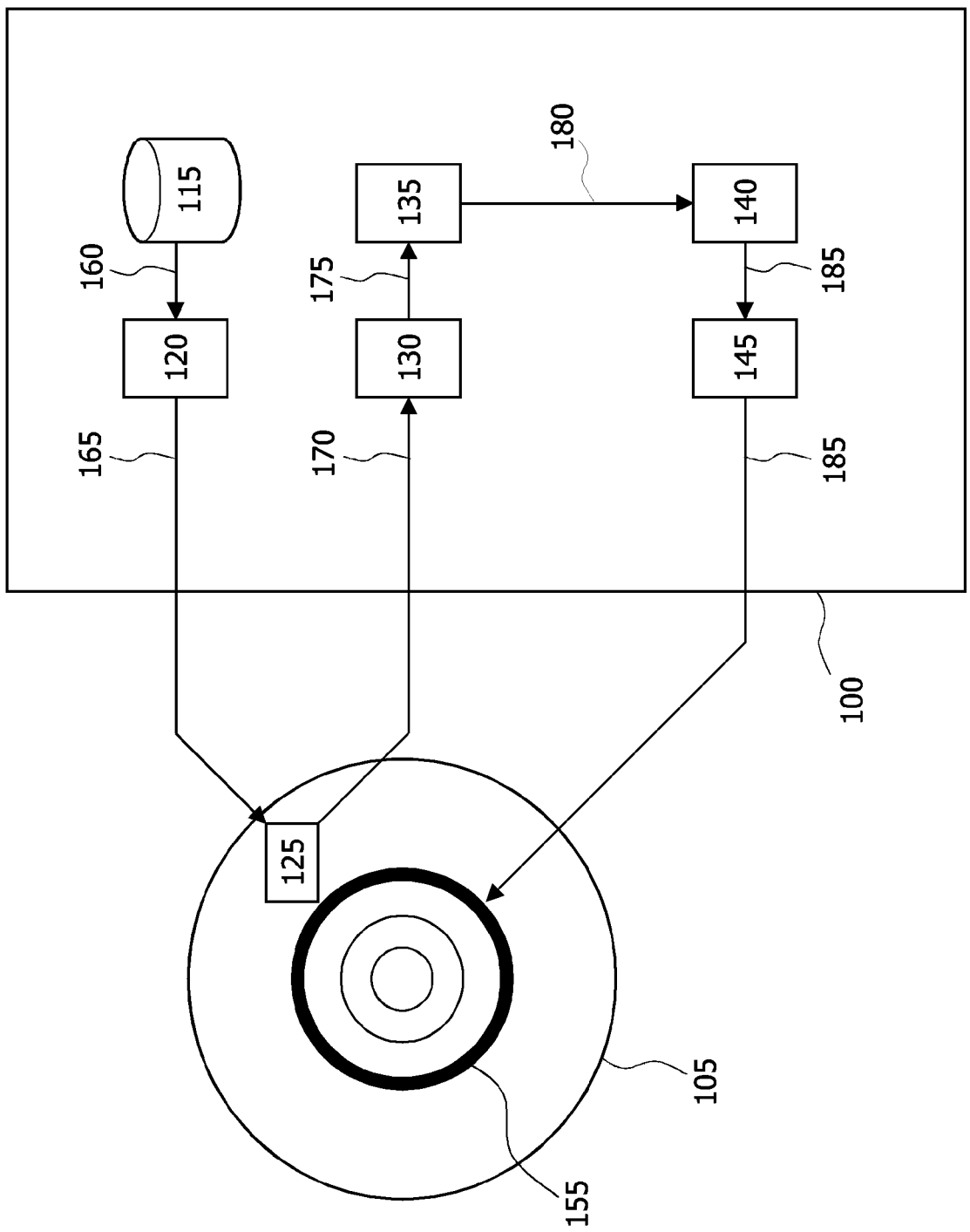

(52) U.S. Cl.
CPC ........... *H04L 9/3234* (2013.01); *H04L 9/3278* (2013.01); *G11B 20/00876* (2013.01); *H04L 9/3236* (2013.01); *G11B 20/00268* (2013.01); *G11B 20/00123* (2013.01)
USPC ............................................ 726/30; 713/186

(56) References Cited

U.S. PATENT DOCUMENTS

| | | | |
|---|---|---|---|
| 6,550,009 B1 | 4/2003 | Uranaka et al. | |
| 6,738,878 B2 | 5/2004 | Ripley et al. | |
| 7,386,122 B1* | 6/2008 | Guillou et al. | 380/30 |
| 7,475,255 B1* | 1/2009 | Guthery | 713/187 |
| 7,480,940 B1* | 1/2009 | Agbabian et al. | 726/22 |
| 7,568,113 B2* | 7/2009 | Linnartz | 713/193 |
| 7,805,764 B1* | 9/2010 | Carson | 726/26 |
| 2001/0016877 A1* | 8/2001 | Dancs et al. | 709/227 |
| 2001/0049662 A1* | 12/2001 | Linnartz et al. | 713/193 |
| 2002/0023223 A1* | 2/2002 | Schmidt et al. | 713/187 |
| 2002/0089920 A1* | 7/2002 | Gotoh et al. | 369/275.3 |
| 2002/0144117 A1* | 10/2002 | Faigle | 713/169 |
| 2002/0186842 A1* | 12/2002 | Sabet-Sharghi et al. | 380/200 |
| 2003/0233561 A1* | 12/2003 | Ganesan et al. | 713/193 |
| 2004/0015694 A1* | 1/2004 | DeTreville | 713/172 |
| 2004/0098585 A1* | 5/2004 | Grove et al. | 713/168 |
| 2004/0168076 A1 | 8/2004 | Linnartz et al. | |
| 2004/0184394 A1* | 9/2004 | Gotoh et al. | 369/275.3 |
| 2004/0199786 A1* | 10/2004 | Walmsley et al. | 713/200 |
| 2004/0213091 A1 | 10/2004 | Shim | |
| 2004/0228487 A1* | 11/2004 | Maeda et al. | 380/232 |
| 2005/0018854 A1 | 1/2005 | Yamamoto et al. | |
| 2005/0047295 A1 | 3/2005 | Kim et al. | |
| 2005/0076225 A1 | 4/2005 | Talstra et al. | |
| 2005/0105884 A1 | 5/2005 | Satoh et al. | |
| 2006/0087950 A1* | 4/2006 | Linnartz | 369/100 |
| 2006/0174110 A1* | 8/2006 | Strom et al. | 713/165 |
| 2006/0236126 A1* | 10/2006 | Adams et al. | 713/193 |
| 2007/0005367 A1* | 1/2007 | DeJean et al. | 704/273 |
| 2007/0180261 A1* | 8/2007 | Akkermans et al. | 713/186 |
| 2007/0226512 A1* | 9/2007 | Kevenaar et al. | 713/186 |
| 2008/0231418 A1* | 9/2008 | Ophey et al. | 340/5.85 |
| 2008/0263367 A1* | 10/2008 | Tatebayashi et al. | 713/193 |
| 2009/0031141 A1* | 1/2009 | Pearson et al. | 713/187 |
| 2009/0259852 A1* | 10/2009 | Linnartz | 713/176 |
| 2009/0282259 A1* | 11/2009 | Skoric et al. | 713/185 |
| 2009/0327763 A1* | 12/2009 | Bade et al. | 713/194 |
| 2010/0174782 A1* | 7/2010 | Rose | 709/204 |
| 2011/0191600 A1* | 8/2011 | Sabet-Sharghi et al. | 713/193 |
| 2013/0001301 A1* | 1/2013 | Brown et al. | 235/375 |

FOREIGN PATENT DOCUMENTS

| | | | | |
|---|---|---|---|---|
| JP | 2005044425 A | | 2/2005 | |
| WO | 0195327 A2 | | 12/2001 | |
| WO | 03/090259 A2 | | 10/2003 | |
| WO | 2004066296 A1 | | 8/2004 | |
| WO | 2004084208 A1 | | 9/2004 | |
| WO | 2004104899 A2 | | 12/2004 | |
| WO | WO 2004104899 A2 | * | 12/2004 | ............. G06F 19/00 |
| WO | 2005008385 A2 | | 1/2005 | |
| WO | 2005048256 A2 | | 5/2005 | |
| WO | 2005086158 A1 | | 9/2005 | |
| WO | 2006/053304 A2 | | 5/2006 | |

OTHER PUBLICATIONS

Jean-Paul Linnartz, et al: New Shielding functions to Enhance Privacy and Prevent Misuse of Biometric Templates, Lecture Notes in Computer Science, Springer Verlag, Berlin, DE, vol. 2688, AVBPA 2003, pp. 393-402.

B. Skoric, et al: Robust Key Extraction from Physical Uncloneable Functions, Lecture Notes in Computer Science, Springer Verlag, Berlin, DE, vol. 3531, ACNS 2005, pp. 407-422.

Blaise Gassend, et al: Controlled Physical Random Functions, Proceedings of the 18th Annual Computer Security Applications Conf. ACSAC 2002, Dec. 9, 2002, pp. 149-160.

Ravikanth Pappu, et al: Physical One-Way Functions, Science, vol. 297, Sep. 20, 2000, pp. 2026-2030.

"Novel Applications of Cryptography in Digital Communications" by Jim K. Omura, May 1990—IEEE Communications Magazine, Table of Contents and pp. 21-29.

"Applied Cryptography, Protocols, Algorithms, and Source Code in C", Second Edition, 1996, by Bruce Schneier, Published by John Wiley & Sons, Inc., pp. 34-41 and 52-56.

"Design and Implementation of the AEGIS Single-Chip Secure Processor Using Physical Random Functions" by G. Edward Suh et al., Proceedings of the 32nd International Symposium on Computer Architecture (ISCA '05), 2005, pp. 1-12.

"AEGIS: A single-chip secure processor" by G. Edward Suh et al., Information Security Technical Report (2005) 10, Elsevier Ltd., pp. 63-73.

* cited by examiner

METHOD AND APPARATUS FOR INFORMATION CARRIER AUTHENTICATION

The invention relates to a method of enabling authentication of an information carrier, the information carrier comprising a writeable part and a physical token arranged to supply a response upon receiving a challenge, the method comprising the following steps; applying a first challenge to the physical token resulting in a first response, and detecting the first response of the physical token resulting in a detected first response data. The invention further relates to an apparatus for enabling authentication of an information carrier.

The invention further relates to a method of authenticating an information carrier, the information carrier comprising an at least formerly writeable part comprising stored information, and a physical token arranged to supply a response upon receiving a challenge, the method comprising the following steps; applying a first challenge to the physical token resulting in a first response, and detecting the first response of the physical token resulting in a detected first response data. The invention further relates to an apparatus for authenticating an information carrier.

The loss of revenues due to pirated objects, such as CDs, DVDs, and software, constitutes a serious economic threat to manufacturers, and vendors alike. In particular low-cost information carriers such a CDs and DVDs that may hold valuable copyrighted content are at this moment susceptible to piracy.

As a result the need to reliably establish authenticity of such information carriers is an important focus of the content industry as well as of the consumer electronics industry. By enabling consumer electronics devices to differentiate between authentic and pirated information carriers it is possible to block access to illegitimate information carriers. The first step in doing so is to reliably authenticate an information carrier.

In international application WO 2004/066296 a reliable storage medium access control method is presented that uses delta-contracting functions for improving the reliability of cryptographic information stored on a storage medium to enable access control to content stored on that storage medium. This particular application also suggests the use of physical one-way functions for generating cryptographic information. Reference is made to an earlier paper by R. Pappu, B. Recht, J. Taylor and N. Gershenfeld, "Physical one-way functions", Science, Vol. 297, 20 September 2002, pp. 2026-2030 that presents an example of such a physical one-way function that can be used to generate cryptographic data.

It is an object of this invention to provide a method that enables the authentication of an information carrier as set forth in the first paragraph without the need to manage the detected first response data of the physical token in a database.

This objective is realised in that the method as set forth in the first paragraph further comprises the following steps: forming a first authentication data based on information derived from the detected first response data, signing the first authentication data, and writing the signed authentication data in the writeable part of the information carrier.

It is a further objective of the present invention to provide a method of authenticating an information carrier as set forth in the second paragraph without the need to manage the detected first response data of the physical token in a database.

This objective is realised in that the method as set forth in the second paragraph further comprises the following steps; forming a first authentication data based on information derived from the detected first response data, reading a signed authentication data from the at least formerly writeable part of the information carrier, deriving a second authentication data from the signed authentication data, and authenticating the information carrier by verifying that the first authentication data matches the second authentication data.

The present invention enables the authentication of an information carrier. To this end the information carrier is fitted with a physical token. This physical token can be embedded in the actual information carrier or could alternatively be attached to the information carrier. In fact the physical token could even be a unique physical property of the information carrier itself. The physical token functions as a physical one-way function. The physical token can be presented with a challenge that results in a response characteristic for the physical token. The response cannot be predicted without knowledge of the physical token that was challenged.

A physical token is often a complex physical system comprising many randomly distributed components. When probed with a suitable challenge, the complex physics governing the interaction between the physical token and the challenge leads to a random-looking output, or response, for each challenge. The complex small-scale structure of the physical token makes it hard to produce a physical copy.

For example, an optical physical token could comprise an optical medium containing many randomly distributed light scatterers. A challenge could be an incident laser-beam, the response the consequent speckle pattern detected by a detector. The pattern of bright and dark spots can be converted into a bit string for further use in authenticating a product.

The challenges presented to the physical token could be pre-determined, and could for example be standardized for a particular information carrier. A description of possible challenges could be downloaded, or could even be embedded in the device that is used to access the information carrier.

In a method according to the present invention a first challenge is applied to the physical token associated with the information carrier. To this end, a first challenge data is obtained, such as the configuration data needed to steer the incident light in the above example, and the corresponding challenge is then applied to the physical token. Next a first response of the physical token is detected resulting in a detected first response data.

The challenge data and detected first response data, when represented in a binary format, comprise a plurality of bits, typically in the order of 40 to 512 bits. The size is relevant to facilitate sufficient opportunity for differentiation between objects. By storing the challenge and detected first response data in a database, it is possible to authenticate the information carrier using the information stored in the database. However maintaining such a challenge response database for information carriers such as e.g. DVD-ROM discs would require an extremely large database that would be extremely hard to manage.

The present invention applies a different approach that does not require the administration of the detected first response data in a database.

To this end the present invention proposes to form a first authentication data based on the detected first response data. This first authentication data is subsequently signed by a trusted party. By signing the first authentication data the authenticity of the first authentication data is safeguarded. For example, when the first authentication data is encrypted using the private key of a trusted party, the first authentication data can only be retrieved correctly when it is decrypted with the corresponding public key.

A malicious party will not be able to successfully forge a signed authentication data without using the private key of the trusted party. By signing the first authentication data the trusted party warrants its integrity and authenticity. As a result it is no longer needed to store the first authentication data in a database. Instead the present invention proposes to store the signed authentication data on the writeable part of the information carrier itself. As a result it is possible to verify authenticity of the medium without the need to access a response database with access control.

In one embodiment this writeable part could be a part that is only writeable once by the manufacturer. In another embodiment this could be a writeable part that is a write-once part that is writeable by the end-user or the manufacturer. In yet another embodiment this could be a re-writeable part, writeable by either.

When an information carrier such as described above is subsequently being authenticated using a method according to the present invention, the physical token on the information carrier is challenged once more using the same pre-determined challenge(s) as was(/were) used in the above method for enabling authentication.

The response of the physical token is detected, and a first authentication data is formed during authentication using the detected first response data. A signed authentication data can be read from the information carrier that was generated using the method for enabling authentication according to the present invention. Subsequently a second authentication data is derived from the signed authentication data. This second authentication data is subsequently matched with the first authentication data that was formed during the authentication. If a match is found then the authenticity of the information carrier is established.

How the second authentication data is derived from the signed authentication data depends on the actual signing process. If, for example, the authentication data is signed by encrypting with the private key of a trusted party, then the second authentication data can be derived by using the accompanying public key of said trusted party. Subsequent verifying comprises matching the first authentication data formed during authentication with the derived second authentication data. Upon a match the information carrier is established as being authentic.

The detection of the first response of the physical function is susceptible to variations of physical parameters, in particular those related to configuring the challenging means, but also to perturbations resulting from measurement noise. This is particularly relevant when the detected first response data is used as the basis for cryptographic processing, and hard decisions. For example, small perturbations at the input of a cryptographic function, such as a bit inversion in a decryption key, will render the output of the decryption useless.

A first improvement to the above method could be applying a particular challenge multiple times in order to obtain more reliable detected first response data, e.g. by using a majority vote on individual bits over all detected first response data. Depending on the robustness of the system further improvements may be required. Delta contracting functions as described in international application WO 2004/104899, "Authentication of a physical object", hereby included by reference, can be used to compensate for such variations and can be used to obtain more reliable authentication data.

WO2004/104899 describes in detail how to generate so-called helper data that can be used during authentication to improve reliability. The helper data and the detected first response data are used as input to a delta-contracting function during authentication. The delta contracting function capitalizes on the redundancy in helper data and the detected first response data to correct for errors in the detected first response data. The output of the delta-contracting function can be interpreted as a noise-compensated response that can be used in further processing.

In an embodiment of the present invention the step of forming a first authentication data in the method of enabling authentication of an information carrier further comprises a sub-step to generate a first helper data for use in authentication of said information carrier. In doing so the method facilitates a more robust authentication.

In yet another embodiment the method as described above is further extended in that this first helper data is subsequently stored in the writeable part of the information carrier for future usage. In doing so, all data required for authentication is kept local to the information carrier and, as a result, authentication can take place off-line.

In an embodiment of the present invention the method of authenticating an information carrier is further extended in that the step of generating the first authentication data involves a sub-step of reading a first helper data from the writeable part of the information carrier, and applying a delta contracting function on the detected first response data using the first helper data.

In another embodiment of the present invention the first authentication data is generated using information comprising both the challenge data as well as the detected first response data. In combining both challenge data and response data, the relationship between challenge data and response data is also warranted. As a result it would not be possible to cheat by modifying the challenge presented to the physical token in order to obtain the same response.

In yet a further embodiment the first authentication data is based on a plurality of responses, or alternatively a plurality of challenge-response pairs. As a result tampering is further complicated as various challenges will be presented to the physical token, and all responses will have to match.

In case the writeable part on the information carrier is small, such as is the case for the Burst Cutting Area (BCA) on a DVD-ROM disc, a size reduction for the first authentication data is in order. During authentication the first authentication data is matched with the second authentication data. In a particularly advantageous embodiment the step for generating the first authentication data comprises the application of a (cryptographic) one-way hash function, or a message digest function. Both functions can be used to further reduce the size of the first authentication data without compromising the ability to differentiate between information carriers.

In doing so the storage requirements needed for storing the signed authentication data in the writeable part of the information carrier can be reduced substantially. Accordingly this approach enables the authentication of a DVD-ROM disc with a small writeable part. The term writeable part should be interpreted such as to cover information carriers that have a once-writeable and/or re-writeable part. Furthermore such a writeable part could be written either by the manufacturer and/or the end-user.

By applying a message digest function a further obstacle is introduced for tampering. The detected response data can be deleted once the signed authentication data has been generated. The detected response data is not stored in its entirety on the information carrier and the detected response data cannot be reconstructed without challenging the physical token embedded in the information carrier. As a result the secrecy of the response, and/or noise-compensated response data are preserved.

For certain applications and/or physical tokens it can be sufficient to have a fixed set of challenges available. However, to further improve the authentication process a further preferred embodiment stores a Uniform Resource Locator (URL) in the writeable part of the information carrier. Alternatively, an index for selecting a set of challenges stored at a predetermined URL could be stored on the information carrier. Although in these particular embodiments it is no longer feasible to perform off-line authentication a larger variety of challenges can be provided, such as a set of pre-defined challenge sets.

In a further embodiment the authentication data can be signed by a trusted party using a secret device key of a particular device. In doing so it is possible to assign a particular disc to a particular device. Both symmetric and asymmetric encryption method are suitable for this purpose.

In another embodiment a subset of the (noise-compensated) response data is used to form a further authentication data in a cryptographically different manner than the first authentication data formed by the method in claim 1. This further authentication data can be used as, or used to generate, a first content key. The first content key is preferably based on the noise-compensated response data. Provided a one-way hash or message digest was applied in generating the first content key, not all information used to generate the first content key is stored on the information carrier. As a result this method of key generation is particularly secure.

Alternatively such a first content key could be based on the same (challenge/)response data used to generate the first authentication data, but using an alternate message digest or one-way hash. As the first content key is based on detected (noise-compensated) response data from the physical token there is a high probability that the first content key will be unique for this particular information carrier.

In another embodiment this first content key is subsequently used to generate a second content key that could be identical for several information carriers. To this end the first content key is combined with a conversion data. The conversion data is selected to map the information carrier specific first content key to the desired second content key. Effectively this conversion data will need to be computed for each individual information carrier and stored on the information carrier.

Above embodiments not only allow the authentication of the information carrier but also provide the basis for content access control for information stored on the information carrier. In addition cryptographic data derived from the physical token could be used as enabling data for granting access to an on-line server.

It is a further objective of the present invention to provide an apparatus that enables the authentication of an information carrier as set forth in the first paragraph without the need to manage the detected first response data of the physical token in a database.

This objective is realised in that the apparatus as set forth in the first paragraph further comprises: an authentication data generation means arranged to form a first authentication data based on information derived from the detected first response data, a signing means arranged to sign the first authentication data, and a writing means arranged to write the signed authentication data in the writeable part of the information carrier.

It is yet a further objective of the present invention to provide an apparatus for authenticating an information carrier as set forth in the second paragraph without the need to manage the detected first response data of the physical token in a database.

This objective is realised in that the apparatus as set forth in the second paragraph further comprises: an authentication data generation means arranged to form a first authentication data based on information derived from the detected first response data, a reading means arranged to read a signed authentication data from the at least formerly writeable part of the information carrier, a derivation means arranged to derive a second authentication data from the signed authentication data, and an authentication means arranged to verify that the first authentication data matches the second authentication data.

Figure 2:
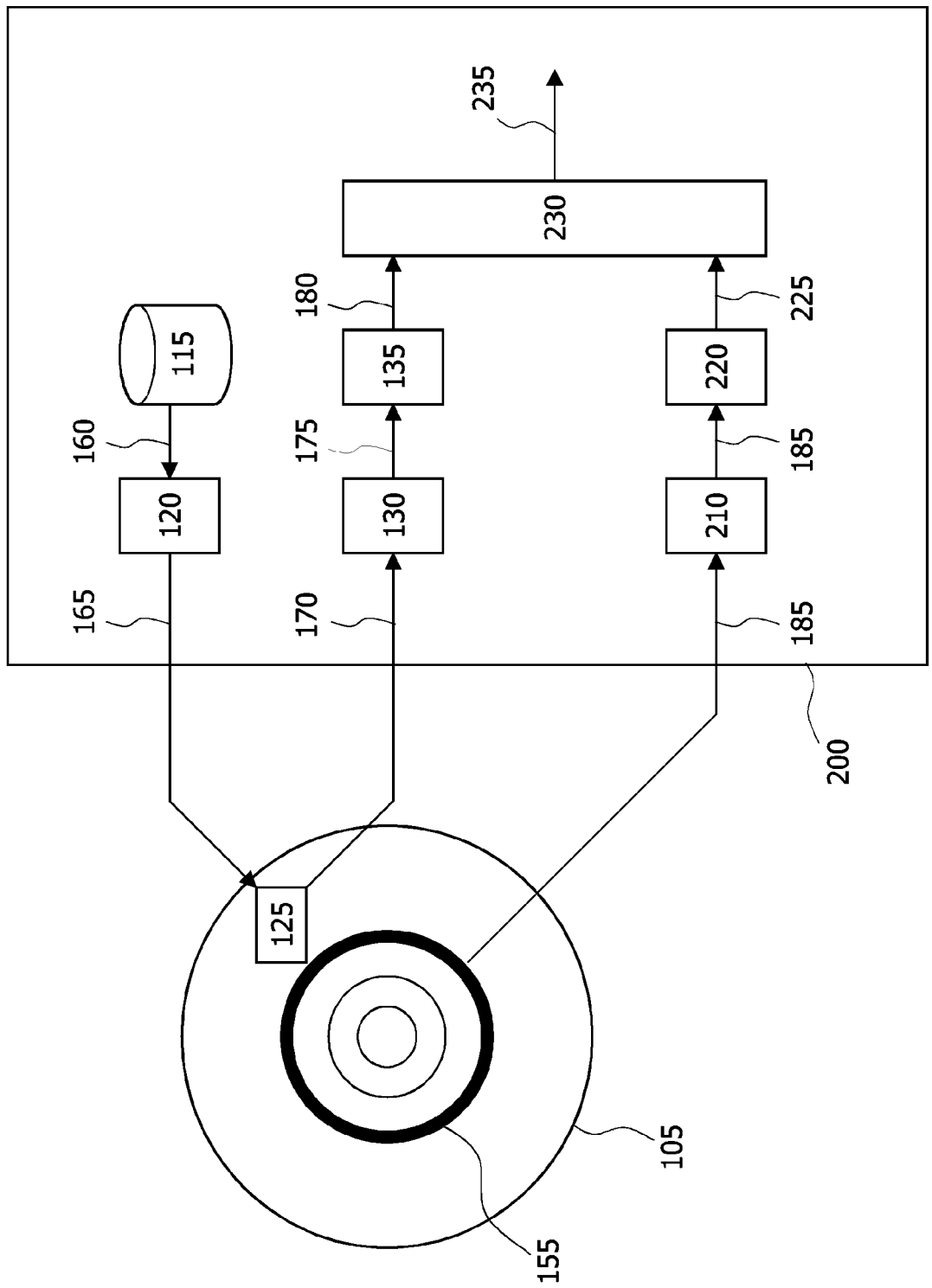
Figure 3:
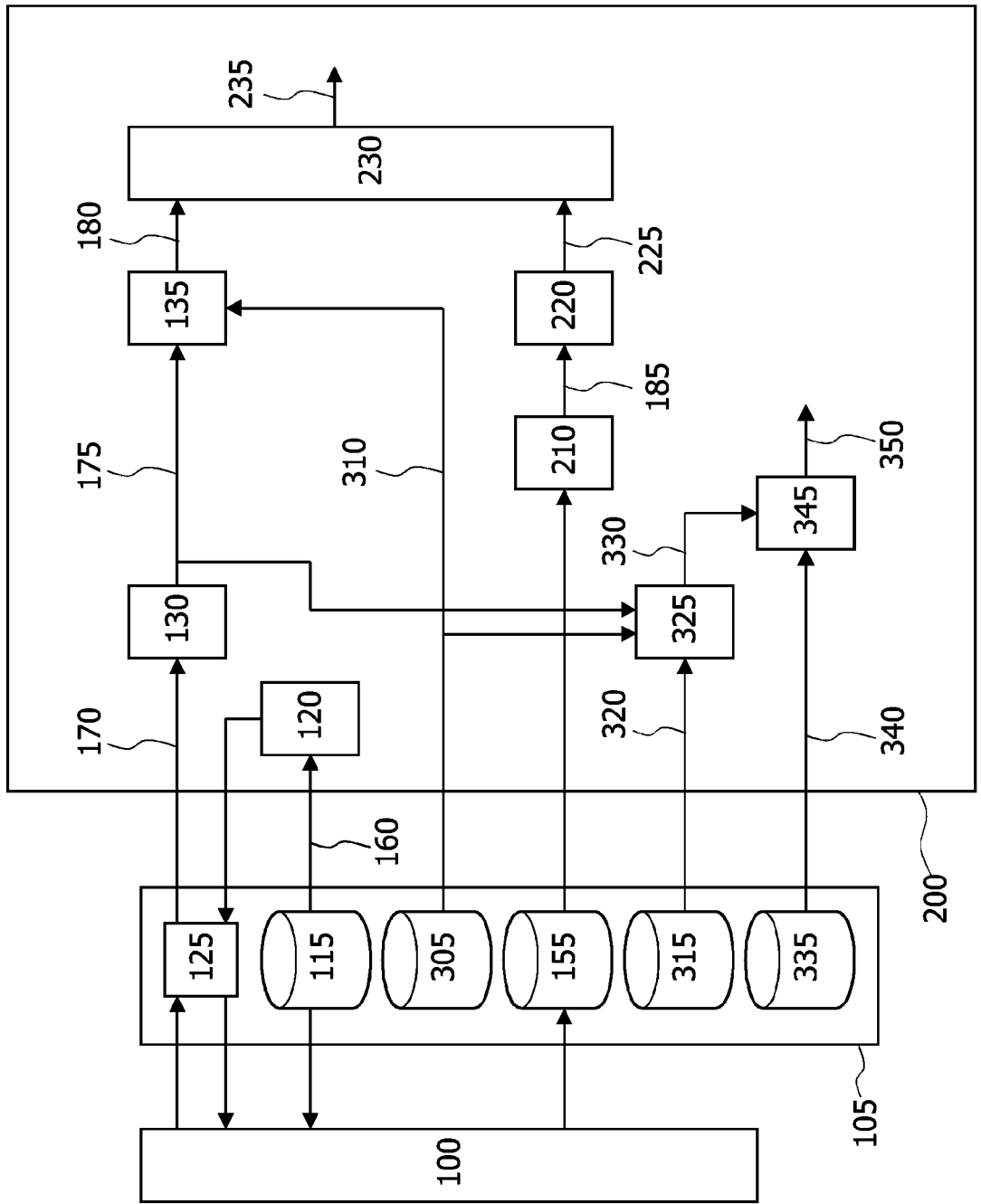

These and other aspects of the invention will be further elucidated and described by way of example and with reference to the drawings, in which:

FIG. 1 is a schematic representation of an optical disc and an apparatus for enabling authentication of an information carrier according to the invention, FIG. 2 is a schematic representation of an optical disc and an apparatus for authentication of an information carrier according to the invention, FIG. 3 is a schematic representation of an apparatus for enabling authentication of an information carrier, an information carrier, and an apparatus for authentication of an information carrier according to the present invention.

Figure 4:
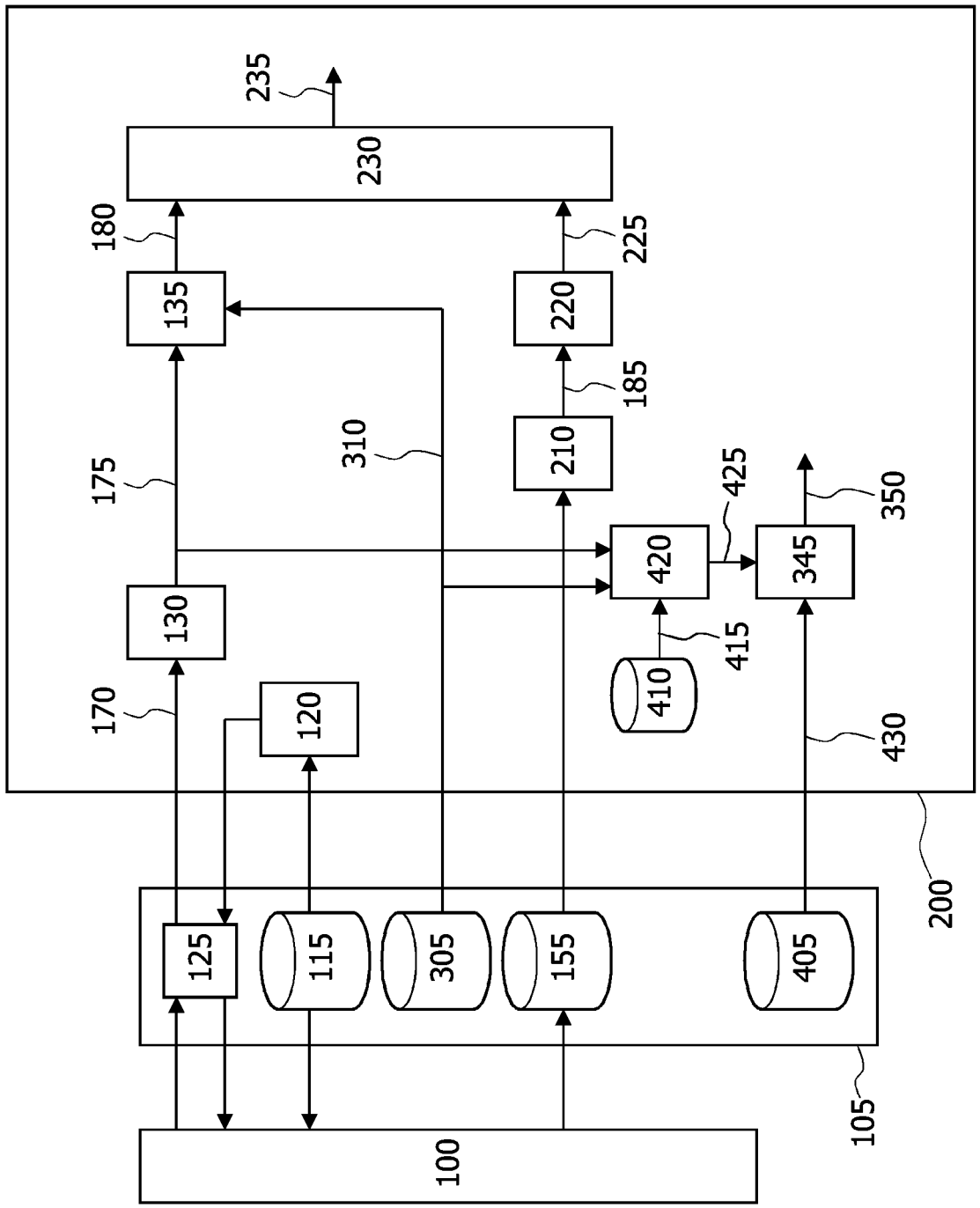

FIG. 4 is a schematic representation of an apparatus for enabling authentication of an information carrier, a further information carrier, and a further apparatus for authentication of an information carrier according to the present invention.

Figure 5:
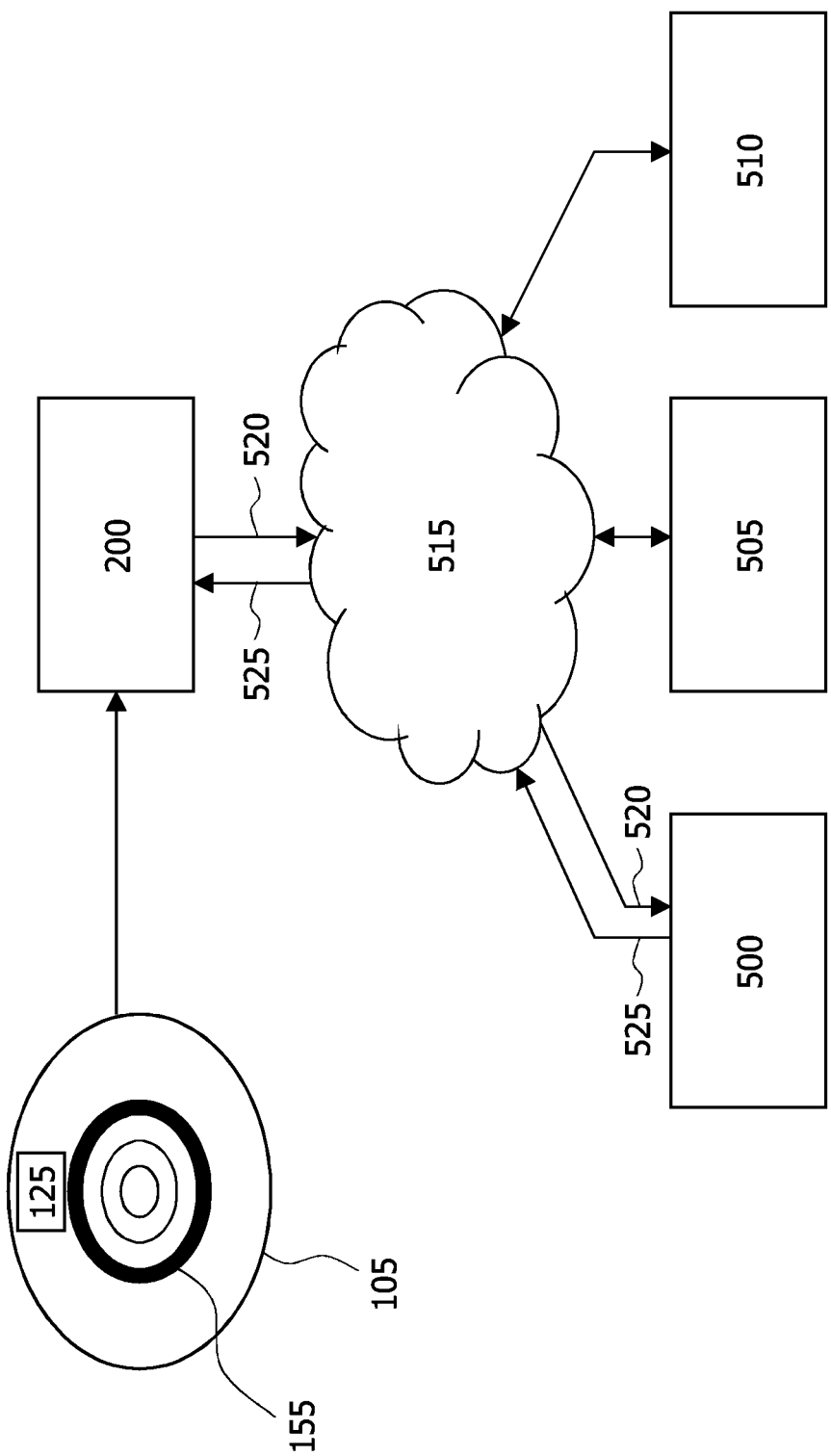

FIG. 5. is a schematic representation of an apparatus for authentication of an information carrier that uses the physical token comprised on the information carrier to access data on a server.

Throughout the drawings, the same reference numeral refers to the same element, or an element that performs the same function.

The present invention uses a physical token attached to or embedded in an information carrier for authenticating the information carrier. In order to reliably authenticate an information carrier two constraints should be satisfied;
   the physical token should provide sufficient opportunity for differentiation, and
   the physical token should be difficult to duplicate.

The amount of differentiation needed is further determined by the requirements of the application. It is important to realize that particular applications require guaranteed uniqueness, whereas others only require a high probability of uniqueness. For example, when a physical token is used for identifying an account-owner, uniqueness is required. In contrast, when such a token is used for differentiating car keys, uniqueness it not required but a high probability of uniqueness is desirable.

The second constraint, the physical token being hard to duplicate, is of a similar nature as the first constraint. Under certain conditions it is desirable that the physical token is uncloneable. In other situations it is acceptable if the effort involved is such that for practical applications the token can be considered uncloneable.

Practical physical uncloneable functions or PUFs, satisfy both requirements in that they are practically uncloneable, and provide a high probability of uniqueness. Furthermore by careful selection of challenges and PUFs it is possible to uniquely identify a particular physical token. This however does require the administration of a database of response information at least during said selection process.

FIG. 1 depicts an apparatus 100 for enabling authentication of an information carrier 105 according to the invention, as well as such an information carrier 105 with a writeable part 155. The information carrier 105 further comprises a physical token 125. The information carrier 105 depicted in FIG. 1 is an optical disc. The present invention however is not restricted to information carriers in the form of optical discs. The present invention could also be applied in e.g. smartcards, badges, and electronic equipment that has a non-volatile memory for storing signed authentication data.

The information carrier 105 in FIG. 1 has a separate physical token 125 attached to it. Although the present example only comprises a single separate physical token 125, the information carrier 105 could be fitted with a plurality of tokens. Furthermore the physical token 125 could also be embedded in the actual information carrier 105, thereby creating a close association between the information carrier 105 and the physical token 125.

The physical token 125 is configured to provide a response following the application of a challenge to the physical token 125. The physical token 125 in turn could be an optical physical token 125, consisting of e.g. a transparent resin comprising a plurality of smaller objects with possibly different refraction indices. The response corresponds to the resulting speckle pattern detected by a detector. Alternatively the physical token 125 could be a capacitive physical token 125 wherein the challenge consists of an electrical signal and the corresponding detected response data being the sampled response detected using a capacitively coupled sensor. The above examples are exemplary for the wide spectrum of physical tokens that can be used to help authenticate the information carrier 105.

When an information carrier 105 is presented to the depicted apparatus 100 for enabling the authentication of an information carrier 105 the apparatus 100 may first check whether the information carrier 105 already comprises a signed authentication data 185 in the writeable part 155. When this is not the case the apparatus 100 will generate such a signed authentication data 185 in order to enable future authentication.

The apparatus 100 for enabling authentication of an information carrier 105 comprises a database of challenges 115 that can be applied to the physical token 125 embedded in the information carrier 105. Preferably a plurality of challenges is used to authenticate the information carrier 105, thereby allowing a more robust authentication of the information carrier 105. Challenge data 160 is selected from the database, preferably in a random manner, and the challenge data 160 is subsequently used by a challenge means 120 to apply a first challenge 165 to the physical token 125 in the information carrier 105. The challenge means 120 could comprise a laser, or could comprise a different further means to challenge the physical token 125. In case of an optical physical token 125 the challenge data 160 could comprise the position data of the laser relative to the physical token 125, and/or the angle at which the laser excites the physical token 125.

The physical token 125 will produce a first response 170 that is detected using a detection means 130. The detection means 130 could be e.g. a two-dimensional detector array of light-sensitive cells, or a single CCD device arranged to register the first response of the physical token 125. The detection means 130 subsequently presents the detected first response data 175 to an authentication data generation means 135 that based on the detected first response data 175 generates the first authentication data 180.

The apparatus 100 for enabling the authentication of an information carrier 105 generates a first authentication data 180 that is used during future authentication. To improve the reliability of future authentication a variety of methods can be envisaged by a person skilled in the art such as detecting various responses to the first challenge 165 and subsequently averaging over the detected data. Further improvements with respect to reliability are possible e.g. by generating a first helper data (not depicted) for use during future authentication, the concept "helper data" is described in detail further below.

Provided that the first authentication data 180 does not require helper data, the first authentication data 180 could be generated by e.g. performing a cryptographic one-way function, such as a one-way hash, or a message digest function applied to the detected first response data 175. The goal of generating the first authentication data 180 in this manner is twofold. Firstly this process reduces the size of the authentication data 180, thereby reducing the amount of storage required. Secondly this process furthermore complicates the process of reverse engineering the detected first response data 175 based on the first authentication data 180, and warrants the security of the detected first response data 175.

As a result of the size reduction resulting from hashing or digesting, the authentication data 180 for an information carrier 105 is no longer guaranteed to be unique. Provided that the first authentication data 180 is chosen sufficiently large (e.g. 40 bits or more), there will be sufficient "resolution" to differentiate between a large number of information carriers.

Once the first authentication data 180 is formed it is submitted to a signing means 140. In the signing means 140 the first authentication data 180 is signed. There will have to be a chain of trust from a trusted party to the signing means 140. In signing the first authentication data the trusted party vouches for the integrity and authenticity of the authentication data 180.

The first authentication data 180 could e.g. be signed by encrypting the first authentication data 180 using the private key of the trusted party. This would allow any party/device authenticating the information carrier 105 to first obtain the accompanying public key, and subsequently to obtain the authentication data 180 from the signed authentication data 185. In addition a checksum could be generated for the first authentication data that is signed together with the authentication data. This checksum then enables an integrity check of the first authentication data after decryption, before use of the first authentication data.

Subsequently a writing means 145 is used to write the signed authentication data 185 in the writeable part 155 of the information carrier 105. The present invention can be applied to a variety of information carriers with either a write-once, and/or a rewriteable part. The present invention is particularly advantageous when the writeable part is a write-once area, particularly if there is effort involved in writing the writeable part and regular end-users and end-user equipment is not capable of writing information in the writeable part.

A particular favourable application of the present invention is the application of the present invention for authenticating bulk-information carriers. Such information carriers, such as e.g. DVD-ROMs, are in principle identical and cannot be individually authenticated. In order to authenticate bulk-information carriers sometimes a small writeable part is create such as the Burst Cutting Area BCA on DVD-ROMs in which an unique identifier can be written. Such discs can however be copied, and the same unique identifier could be written.

The present invention however provides a solution for this problem in that a Physical Uncloneable Function can be used to help authenticate the information carrier. The challenge/ response data associated with a PUF are in general much larger than the very small amount of storage available in the BCA.

The present invention facilitates the authentication of such a bulk information-carrier using a physical token even in the presence of only a very small write-once writeable part.

The BCA is a feature described in Annex K of the DVD physical specification that normally provides a bar code that is individually written to DVDs inside the lead-in area. The BCA can be written using a powerful laser such as a YAG or CO2 laser that burns and darkens the aluminium or other reflective metal layer in the centre of the DVD. The BCA contains up to 188 bytes.

Signed authentication data can be stored in the BCA instead of the bar code, thereby enabling the authentication of said DVD-ROM disc, provided it is fitted with the corresponding physical token 125. As the amount of writeable storage in the BCA is limited it is preferred that signing the first authentication data does not add bytes. A particularly advantageous way to sign the first authentication data employs a scheme in which the size of the first authentication data equals the size of the signed authentication data. One way to accomplish this is using an RSA signature for which this property holds. Although particularly advantageous for DVD-ROMs, this particular manner of signing is not restricted to DVD-ROMs.

The present invention is particularly useful for authenticating optical discs that comprise only a small write-once section such as a BCA in that the present invention does not require further administration of response data in a controlled database by the manufacturer. In fact the present invention fits well in the current optical disc manufacturing process in that the means for enabling the authentication of an information carrier 105 can be incorporated in devices that are currently used to write the BCA.

Apart from application on DVD-ROMs the present invention could also be applied to other optical information carriers that comprise a small writeable part such DVD_RW discs that comprise a Narrow Burst Cutting Area.

FIG. 2 depicts an apparatus 200 for authenticating an information carrier 105 as well as an information carrier 105. The information carrier 105 comprises a physical token 125, as well as an at least formerly writeable part 155 in which a signed authentication data is stored.

Part of the authentication process conducted by the apparatus 200 for authenticating an information carrier 105 is similar to the situation as described with reference to FIG. 1 in that both generate a first authentication data 180. During authentication the first authentication data 180 is formed in order to compare it with an earlier generated second authentication data 225 that is stored in a signed format on the information carrier 105. In case the signed authentication data 185 was generated using multiple different challenges and corresponding responses the same process will have to be repeated for generating the first authentication data 180. In practice these challenges can be pre-determined, downloaded in the apparatus 200, or information with respect to the challenges might be provided in the writeable part 155 and/or non-writeable part if present.

Although authentication data 180 could be based on a single response to a single challenge, it is further possible to use a plurality of responses to a single challenge, or a plurality of responses to a plurality of challenges. The authentication data 180 could be based solely on the response data, but the authentication data generation means 135 could also cover the challenge data. In doing so the present invention can relate both challenges and responses to the authentication data.

The apparatus 200 for authenticating an information carrier 105 will have to verify whether the first authentication data 180 established during authentication corresponds with the second authentication data 225 used to generate the signed authentication data 185. To this end the apparatus 200 further comprises a reading means 210 arranged to read the signed authentication data 185 from the at least formerly writeable part 155 from the information carrier. The signed authentication data 185 is then submitted to a derivation means 220.

In case the signed authentication data 185 was generated by encrypting the earlier generated second authentication data with the private key of a known trusted party the apparatus 200 for authenticating can decrypt the second authentication data 225 using the public key of the trusted party. In FIG. 2 the second authentication data 225 is derived from the signed authentication data 185 by a derivation means 220. Subsequently it is verified by an authentication means 230 whether the first authentication data and the second authentication data match; in case of a match the information carrier 105 is reported to be authentic in report 235.

Alternatively the signed authentication data 185 could be a certificate, a document signed by a trusted party, comprising: a Uniform Resource Locator (URL), as defined in RFC 1738, indicating where the public key of the trusted party can be obtained, and the signed authentication data.

In yet another embodiment the signed authentication data 185 could comprise the actual public key of the trusted party signed using the private key of a Certifying Authority. This allows devices/parties that are known to the Certifying Authority as being trustworthy to sign the second authentication data. A person skilled in the art it will appreciate that the above methods are exemplary instances of procedures for proving authenticity/integrity of the second authentication data to the authenticating party/device.

The signed authentication data 185 could further be signed using a secret device key (not shown) particular to a device. In doing so the information carrier 105 is effectively configured for exclusive use by that particular device.

Once the apparatus 200 for authenticating an information carrier 105 has established the authenticity of the information carrier 105 the apparatus 200 could grant a user access to further information on the information carrier 105. In order to enforce such access control it is advisable to encrypt content on the information carrier 105 using a content key.

As an information carrier 105 according to the present invention comprises a physical token 125, the response data of the token could be used to generate a (plurality) of key(s) that can be used to decrypt (part of) the content on the information carrier 105. Two scenarios can be envisaged:

1. Content on the information carrier 105 is encrypted using a first content key, possibly different for each information carrier 105.
2. Content on the information carrier 105 is encrypted using a second content key, identical for groups of/all information carriers.

To generate a content encryption/decryption key for (part) of the content on the information carrier 105 in the first scenario, it is sufficient to generate an alternate authentication data based on a subset of the (challenge/)response data used for forming the first authentication data. Provided the information carrier 105 is authentic this procedure will result in a secure content encryption/decryption key.

Alternatively the same (challenge/)response data could be used as was used for generating the first authentication data followed by a different message digest, or one-way hash function. In doing so it is possible to generate a first content key that is very likely to be unique for each individual disc in a secure manner.

As there is a high probability that following the above procedure(s) leads to a unique content encryption/decryption key a further step is needed to generate the second content key that is the same for groups of information carriers. This further step maps the unique first content key onto the second content key, that may be pre-determined, that is the same for groups of information carriers. A simple method of doing so is to introduce a conversion data that is stored on the information carrier 105 in the writeable part, optionally the conversion data is also signed by the trusted party.

The conversion data can e.g. be generated by exor-ing (boolean operation) the first content key with the second content key. Subsequent generating the second content key from the first content key comprises exor-ing (boolean operation) the first content key with the conversion data.

Provided that a malicious party is unaware of the second content key and the private key of the trusted party, a malicious party cannot use the conversion data to its advantage.

FIG. 3 depicts a schematic representation of an apparatus 100 for enabling authentication of an information carrier 105, an information carrier 105, and an apparatus 200 for authenticating an information carrier 105 according to the present invention that employs both a first helper data 310 and conversion data 320.

The information carrier 105 depicted in FIG. 3 shows in a simplified manner the various types of information stored on the information carrier 105. The information carrier 105 comprises;
  an information repository 115 for holding a challenge database comprising a first challenge 160,
  an information repository 305 for holding a first helper data 310 used during the authentication of an information carrier 105 using the first challenge 160,
  an information repository 155 for holding a signed authentication data 185 used during the authentication of an information carrier 105 using the first challenge 160,
  an information repository 315 for holding a conversion data 320 used for generating a second content key 330, and
  an information repository 335 for holding encrypted content encrypted with the second content key 330.

The apparatus 200 for authenticating an information carrier 105 according to the present invention resembles that in FIG. 2. However, the authentication data generation means 135 is further arranged to obtain a first helper data 310 associated with the first challenge 160 from the corresponding repository 305 on the information carrier 105. The first helper data 310 is used together with the detected first response data 175 to form the first authentication data 180. To this end the first helper data 310 and the detected first response data 175 are offered to a delta contracting function resulting in a robust first response. The delta contracting function capitalizes on the redundancy present in the first helper data 310 and the detected first response data 175, and uses this redundancy to compensate for bit errors in the detected first response data 175. Although the first helper data need not be signed, signing the first helper data can help to provide proof of authenticity of the first helper data.

For more information with respect to the use of helper data and delta-contracting functions reference is made to "New shielding functions to enhance privacy and prevent misuse of biometric templates", by J. P. Linnartz and P. Tuyls, Proc. AVBPA 2003, 4. International Conference on Audio- and Video-Based Biometric Person Authentication.

Using the robust first response the authentication data generation means 135 applies a first message digest function in order to map the robust first response onto the first authentication data 180.

The embodiment in FIG. 3 further comprises a first key generation means 325 arranged to generate a second content key 330 using the detected first response data 175, the first helper data 310, and the conversion data 320. The first step is to generate a first content key (not shown) by obtaining a robust response analogous to the procedure followed in the authentication data generation means 135. The resulting robust response is subsequently presented to an alternate secret message digest function or alternate one-way hash function in order to obtain a first content key.

The first key generation means 325 next retrieves a conversion data 320 from the conversion data repository 315 on the information carrier 105. The conversion data 320 is subsequently combined with the first content key using a boolean exclusive-or operation resulting in the second content key 330.

The conversion data 320 can be generated by first establishing the first content key, establishing a desired second content key, and subsequently determining the boolean exclusive-or over the first and second content key. Although here the exclusive-or operation is used as a particularly simple example, other more complex operations can be applied.

This indirect approach using the conversion data 320 allows the generation of a content encryption key that can be used to encrypt read-only content on multiple information carriers that have different physical tokens. A practical example of such an application would be the encryption of pre-pressed content on a DVD-ROM disc.

The embodiment in FIG. 3 further comprises a content decryption means 345 that on user request uses the first content key 330 to decrypt the encrypted content data 340 stored on the information carrier 105, resulting in the decrypted content data 350. Effectively this particular embodiment enables authentication of an information carrier and subsequent decryption in order to enable the rendition of encrypted content data for a user.

FIG. 4 depicts a schematic representation of an apparatus 100 for enabling authentication of an information carrier 105, an information carrier 105, and an apparatus 200 for authenticating an information carrier 105 according to the present invention that employs a first helper data 310.

The apparatus 200 for authenticating an information carrier 105 depicted in FIG. 4 resembles the apparatus 200 presented in FIG. 3, in that it uses the same procedure to establish a robust first response based on the detected first response data 175.

The robust first response is determined in the authentication data generation means 135, as well as in a second key generation means 420. The second key generation means applies a message digest function on the robust first response, different from the message digest function employed in the authentication data generation means 135. Next the second key generation means retrieves a secret device key 415 from its device key repository 410. This secret device key 415 is used to generate a first content key 425 by encrypting the output of the message digest function with the secret device key 415.

The resulting first content key is not only unique for this particular information carrier 105, it is also unique for this particular device 200, in that it was generated using the secret device key. As a result this particular apparatus 200 can be used to decrypt data 430 stored on the information carrier 105 at 405 that is solely intended for this device 200, thereby enabling e.g. a selective firmware upgrade for a particular device, or a device specific software license for a particular personal computer.

FIG. 5 presents a further application of an apparatus 200 for authenticating an information carrier 105. FIG. 5 depicts an information carrier 105 according to the present invention further comprising pre-pressed content, and an apparatus 200 for authenticating an information carrier 105 according to the present invention. The apparatus 200 can use the physical token 125 embedded in the information carrier 105 to generate a first content key 520 that is likely to be unique for this particular information carrier 105.

The first content key 520 generated by the apparatus 200 can subsequently be used to obtain access to further content or services 525 from a server 500, e.g. from the studio that released the information carrier 105. To this end the apparatus 200 is connected to a network 515, such as the Internet, a Local Area Network, or a UMTS network, that facilitates the exchange of such content and services. Network 515 is connected to server 500, and to 505 and 510.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of enabling an information carrier for authentication by a particular device, the information carrier being electronic equipment having a non-volatile memory for storing signed authentication data, the information carrier comprising a writeable part and a physical token, the physical token being arranged to supply a response upon receiving a challenge through interaction between the physical token and the challenge, the method comprising acts of:

applying a first challenge represented by challenge data to the physical token resulting in a first response, the physical token supplying the first response upon receiving the first challenge, and detecting the first response of the physical token resulting in a detected first response data, forming a first authentication data based on information derived from the detected first response data, forming the first authentication data further comprising generating a first helper data for use in a delta contracting function during authentication of the information carrier, signing the first authentication data using a secret device key of the particular device to configure the information carrier for exclusive use by the particular device, and writing the signed authentication data and the first helper data in the writeable part of the information carrier, wherein the information used in forming the first authentication data comprises both the challenge data as well as the information derived from the detected first response data.

2. A method of authenticating an information carrier by a particular device, the information carrier being electronic equipment having a non-volatile memory for storing signed authentication data, the information carrier comprising an at least formerly writeable part comprising stored information and a physical token, the physical token being arranged to supply a response upon receiving a challenge through interaction between the physical token and the challenge, the at least formerly writeable part comprising signed authentication data that was previously obtained by signing second authentication data with a secret device key of the particular device such that the information carrier is exclusively useable by the particular device, the second authentication data comprising information derived from a detected response of the physical token, the method comprising acts of:

applying a first challenge represented by challenge data to the physical token resulting in a first response, the physical token supplying the first response upon receiving the first challenge, and detecting the first response of the physical token resulting in a detected first response data, forming a first authentication data based on information derived from the detected first response data, by reading a first helper data from the writeable part of the information carrier, and applying a delta contracting function on the detected first response data using the first helper data, reading the signed authentication data from the at least formerly writeable part of the information carrier, deriving the second authentication data from the signed authentication data with the deriving depending on the signing used to enable the information carrier for authentication by the particular device, and authenticating the information carrier by verifying that the first authentication data matches the second authentication data, wherein the information used in forming the first authentication data comprises both the challenge data as well as the information derived from the detected first response data.

3. The method of claim 1, wherein the physical token is a physical one-way function.

4. The method of claim 1, wherein the information used to form the first authentication data comprises a plurality of detected first response data resulting from a pre-determined plurality of challenges, the plurality of challenges and the plurality of detected first response data forming a plurality of challenge-response pairs.

5. The method of claim 1, wherein forming the first authentication data comprises an act of applying at least one of the following functions:
a cryptographic one-way function,
an encryption function, and
a decryption function.

6. The method of claim 1, wherein signing the first authentication data comprises an act of applying an encryption function.

7. An apparatus for enabling an information carrier for authentication by a particular device, the information carrier being electronic equipment having a non-volatile memory for storing signed authentication data, the information carrier comprising a writeable part and a physical token, the physical token being arranged to supply a response upon receiving a challenge through interaction between the physical token and the challenge, the apparatus comprising:

a challenge means arranged to apply a first challenge represented by challenge data to the physical token resulting in a first response, the physical token supplying the first response upon receiving the first challenge, and a detection means arranged to detect the first response of the physical token resulting in a detected first response data, an authentication data generation means arranged to form a first authentication data based on information derived from the detected first response data, forming the first authentication data further comprising generating a first helper data for use in a delta contracting function during authentication of the information carrier, a signing means arranged to sign the first authentication data using a secret device key of the particular device to configure the information carrier for exclusive use by the particular device, and a writing means arranged to write the signed authentication data and the first helper data in the writeable part of the information carrier, wherein the information used in forming the first authentication data comprises both the challenge data as well as the information derived from the detected first response data.

8. An apparatus for authenticating an information carrier, the information carrier being electronic equipment having a non-volatile memory for storing signed authentication data, the information carrier comprising an at least formerly writeable part comprising stored information, and a physical token, the physical token being arranged to supply a response upon receiving a challenge through interaction between the physical token and the challenge, the at least formerly writeable part comprising signed authentication data that was previously obtained by signing second authentication data with a secret device key of the particular device such that the information carrier is exclusively useable by the particular device, the second authentication data comprising information derived from a detected response of the physical token, the apparatus comprising:

a challenge means arranged to apply a first challenge represented by challenge data to the physical token resulting in a first response, the physical token supplying the first response upon receiving the first challenge, and a detection means arranged to detect the first response of the physical token resulting in a detected first response data, an authentication data generation means arranged to form a first authentication data based on information derived from the detected first response data, by reading a first helper data from the writeable part of the information carrier, and applying a delta contracting function on the detected first response data using the first helper data, a reading means arranged to read the signed authentication data from the at least formerly writeable part of the information carrier, a derivation means arranged to derive the second authentication data from the signed authentication data, the deriving depending on the signing used to enable the information carrier for authentication by the particular device, and an authentication means arranged to verify that the first authentication data matches the second authentication data, wherein the information used in forming the first authentication data comprises both the challenge data as well as the information derived from the detected first response data.

9. A non-transitory information carrier, the information carrier being electronic equipment having a non-volatile memory for storing signed authentication data, the information carrier comprising:

an at least formerly writeable part comprising stored information and a physical token arranged to supply a response upon receiving a challenge through interaction between the physical token and the challenge, the information carrier being characterized in that it comprises in the writeable part a signed authentication data and first helper data generated according to a method of enabling an information carrier for authentication by a particular device, the method comprising acts of:

applying a first challenge represented by challenge data to the physical token resulting in a first response, the physical token supplying the first response upon receiving the first challenge, and detecting the first response of the physical token resulting in a detected first response data, forming a first authentication data based on information derived from the detected first response data, forming the first authentication data further comprising generating a first helper data for use in a delta contracting function during authentication of the information carrier, signing the first authentication data using a secret device key of the particular device to configure the information carrier for exclusive use by the particular device, and writing the signed authentication data and the first helper data in the writeable part of the information carrier, wherein the information used in forming the first authentication data comprises both the challenge data as well as the information derived from the detected first response data.

10. The information carrier as claimed in claim 9, wherein the physical token is a physical one-way function.

11. The information carrier as claimed in claim 9, the information carrier further comprising digital content that has been encrypted with a first content key that can be reconstructed using a further authentication data based on said detected first response data from the physical token.

12. The information carrier as claimed in claim 9, the information carrier further comprising digital content that has been encrypted with a second content key that can be reconstructed using a further authentication data based on said detected first response from the physical token and a conversion data stored in the writeable part.

13. A computer program product comprising a non-transitory computer readable medium for performing a method of enabling an information carrier for authentication by a particular device when said program product is executed on a computer, the information carrier being electronic equipment having a non-volatile memory for storing signed authentication data, the information carrier comprising a writeable part and a physical token, the physical token being arranged to supply a response upon receiving a challenge through interaction between the physical token and the challenge, the method comprising acts of:

applying a first challenge represented by challenge data to the physical token resulting in a first response, the physical token supplying the first response upon receiving the first challenge, and detecting the first response of the physical token resulting in a detected first response data, forming a first authentication data based on information derived from the detected first response data, forming the first authentication data further comprising generating a first helper data for use in a delta contracting function during authentication of the information carrier, signing the first authentication data using a secret device key of the particular device to configure the information carrier for exclusive use by the particular device, and writing the signed authentication data and the first helper data in the writeable part of the information carrier, wherein the information used in forming the first authentication data comprises both the challenge data as well as the information derived from the detected first response data.

14. The method as claimed in claim 1, further comprising signing the first helper data.

15. The method as claimed in claim 2, further comprising:
reconstructing a first content key using a further authentication data based on said detected first response data from the physical token, and
obtaining access to further content or services from a server using the first content key.

16. A method of enabling authentication of an information carrier by a particular device, the information carrier being electronic equipment having a non-volatile memory for storing signed authentication data, the information carrier comprising a writeable part and a physical token, the physical token being arranged to supply a response upon receiving a challenge through interaction between the physical token and the challenge, the method comprising acts of:
applying a first challenge represented by challenge data to the physical token resulting in a first response, the physical token supplying the first response upon receiving the first challenge, and
detecting the first response of the physical token resulting in a detected first response data,
forming a first authentication data based on information derived from the detected first response data, forming the first authentication data further comprising generating a first helper data for use in a delta contracting function during authentication of the information carrier,
signing the first authentication data using a secret device key of the particular device to configure the information carrier for exclusive use by the particular device, and
writing the signed authentication data and the first helper data in the writeable part of the information carrier,
wherein the information used in forming the first authentication data comprises both the challenge data as well as the information derived from the detected first response data.

17. A method of authenticating an information carrier by a particular device, the information carrier being electronic equipment having a non-volatile memory for storing signed authentication data, the information carrier comprising an at least formerly writeable part comprising stored information and a physical token, the physical token being arranged to supply a response upon receiving a challenge through interaction between the physical token and the challenge, the method comprising acts of:
applying a first challenge represented by challenge data to the physical token resulting in a first response, the physical token supplying the first response upon receiving the first challenge, and
detecting the first response of the physical token resulting in a detected first response data,
forming a first authentication data based on information derived from the detected first response data, by reading a first helper data from the writeable part of the information carrier, and applying a delta contracting function on the detected first response data using the first helper data,
reading a signed authentication data from the at least formerly writeable part of the information carrier, the signed authentication data being derived from a secret device key of the particular device such that the information carrier is exclusively useable by the particular device,
deriving a second authentication data from the signed authentication data with the deriving depending on the signing used to enable the information carrier for authentication by the particular device, and
authenticating the information carrier by verifying that the first authentication data matches the second authentication data,
wherein the information used in forming the first authentication data comprises both the challenge data as well as the information derived from the detected first response data.

18. An apparatus for enabling authentication of an information carrier by a particular device, the information carrier being electronic equipment having a non-volatile memory for storing signed authentication data, the information carrier comprising a writeable part and a physical token, the physical token being arranged to supply a response upon receiving a challenge through interaction between the physical token and the challenge, the apparatus comprising:
a challenge means arranged to apply a first challenge represented by challenge data to the physical token resulting in a first response, the physical token supplying the first response upon receiving the first challenge, and
a detection means arranged to detect the first response of the physical token resulting in a detected first response data,
an authentication data generation means arranged to form a first authentication data based on information derived from the detected first response data, forming the first authentication data further comprising generating a first helper data for use in a delta contracting function during authentication of the information carrier,
a signing means arranged to sign the first authentication data using a secret device key of the particular device to configure the information carrier for exclusive use by the particular device, and
a writing means arranged to write the signed authentication data and the first helper data in the writeable part of the information carrier, wherein the information used in forming the first authentication data comprises both the challenge data as well as the information derived from the detected first response data.

19. An apparatus for authenticating an information carrier, the information carrier being electronic equipment having a non-volatile memory for storing signed authentication data, the information carrier comprising an at least formerly writeable part comprising stored information, and a physical token, the physical token being arranged to supply a response upon receiving a challenge through interaction between the physical token and the challenge, the apparatus comprising:
a challenge means arranged to apply a first challenge represented by challenge data to the physical token resulting in a first response, the physical token supplying the first response upon receiving the first challenge, and
a detection means arranged to detect the first response of the physical token resulting in a detected first response data,
an authentication data generation means arranged to form a first authentication data based on information derived from the detected first response data, by reading a first helper data from the writeable part of the information carrier, and applying a delta contracting function on the detected first response data using the first helper data,
a reading means arranged to read a signed authentication data from the at least formerly writeable part of the information carrier, the signed authentication data being derived from a secret device key of the particular device such that the information carrier is exclusively useable by the particular device, a derivation means arranged to derive a second authentication data from the signed authentication data, the deriving depending on the signing used to enable the information carrier for authentication by the particular device, and an authentication means arranged to verify that the first authentication data matches the second authentication data, wherein the information used in forming the first authentication data comprises both the challenge data as well as the information derived from the detected first response data.

20. A non-transitory information carrier, the information carrier being electronic equipment having a non-volatile memory for storing signed authentication data, the information carrier comprising:

an at least formerly writeable part comprising stored information and a physical token arranged to supply a response upon receiving a challenge through interaction between the physical token and the challenge, the information carrier being characterized in that it comprises in the writeable part a signed authentication data and first helper data generated according to a method of enabling an information carrier for authentication by a particular device, the method comprising acts of:

applying a first challenge represented by challenge data to the physical token resulting in a first response, the physical token supplying the first response upon receiving the first challenge, and detecting the first response of the physical token resulting in a detected first response data, forming a first authentication data based on information derived from the detected first response data, forming the first authentication data further comprising generating a first helper data for use in a delta contracting function during authentication of the information carrier, signing the first authentication data using a secret device key of the particular device to configure the information carrier for exclusive use by the particular device, and writing the signed authentication data and the first helper data in the writeable part of the information carrier, wherein the information used in forming the first authentication data comprises both the challenge data as well as the information derived from the detected first response data.

21. A computer program product comprising a non-transitory computer readable medium for performing a method of enabling an information carrier for authentication by a particular device when said program product is executed on a computer, the information carrier being electronic equipment having a non-volatile memory for storing signed authentication data, the information carrier comprising a writeable part and a physical token, the physical token being arranged to supply a response upon receiving a challenge through interaction between the physical token and the challenge, the method comprising acts of:

applying a first challenge represented by challenge data to the physical token resulting in a first response, the physical token supplying the first response upon receiving the first challenge, and detecting the first response of the physical token resulting in a detected first response data, forming a first authentication data based on information derived from the detected first response data, forming the first authentication data further comprising generating a first helper data for use in a delta contracting function during authentication of the information carrier, signing the first authentication data using a secret device key of the particular device to configure the information carrier for exclusive use by the particular device, and writing the signed authentication data and the first helper data in the writeable part of the information carrier, wherein the information used in forming the first authentication data comprises both the challenge data as well as the information derived from the detected first response data.

\* \* \* \* \*